United States Patent
Hyvrard et al.

(10) Patent No.: US 6,861,041 B2
(45) Date of Patent: Mar. 1, 2005

(54) METHOD FOR TREATING AND UPGRADING EFFLUENTS CONTAINING METALLIC SULPHATES USING AN AMMONIA ADDITION STEP

(75) Inventors: Francois Hyvrard, Triel-sur-Seine (FR); Pascal Muller, Mantes la Ville (FR)

(73) Assignee: Sarp Industries, Limay (FR)

( * ) Notice: Subject to any disclaimer, the term of this patent is extended or adjusted under 35 U.S.C. 154(b) by 15 days.

(21) Appl. No.: 10/257,829

(22) PCT Filed: Apr. 17, 2001

(86) PCT No.: PCT/FR01/01180
§ 371 (c)(1),
(2), (4) Date: Jan. 24, 2003

(87) PCT Pub. No.: WO01/81255
PCT Pub. Date: Nov. 1, 2001

(65) Prior Publication Data
US 2004/0089612 A1 May 13, 2004

(30) Foreign Application Priority Data
Apr. 21, 2000 (FR) .............................. 00 05209
May 31, 2000 (FR) .............................. 00 07072

(51) Int. Cl.⁷ .......................... C01B 13/36; C01C 1/02; C01F 11/46; C02F 9/00
(52) U.S. Cl. ...................... 423/555; 210/726; 423/356; 423/592.1
(58) Field of Search .................. 423/356, 548, 423/555, 592.1; 210/710, 712, 718, 724, 726, 737, 912

(56) References Cited
U.S. PATENT DOCUMENTS

| | | | | |
|---|---|---|---|---|
| 961,764 A | * | 6/1910 | Falding | 423/144 |
| 997,237 A | * | 7/1911 | Carrick et al. | 423/144 |
| 2,151,261 A | * | 3/1939 | Bartlett | 423/35 |
| 2,271,524 A | * | 2/1942 | Marek | 423/145 |
| 2,333,672 A | * | 11/1943 | Oliver et al. | 423/194 |
| 2,374,454 A | * | 4/1945 | Oliver et al. | 423/144 |
| 2,416,744 A | * | 3/1947 | Francis | 423/144 |
| 2,427,555 A | * | 9/1947 | Elzi | 423/144 |
| 2,529,874 A | * | 11/1950 | Hoak | 423/145 |
| 2,639,222 A | * | 5/1953 | Tanski | 423/147 |
| 2,642,334 A | * | 6/1953 | Nugey | 423/192 |
| 2,692,229 A | * | 10/1954 | Heise et al. | 210/712 |
| 2,798,802 A | * | 7/1957 | Roy et al. | 423/144 |
| 2,845,332 A | * | 7/1958 | Allison et al. | 423/144 |
| 3,261,665 A | * | 7/1966 | Rathmell | 423/140 |
| 3,375,066 A | * | 3/1968 | Murakami et al. | 423/166 |
| 3,927,173 A | * | 12/1975 | Melzer | 423/142 |
| 3,981,966 A | | 9/1976 | Baucom | 423/104 |
| 4,006,080 A | * | 2/1977 | Twist et al. | 210/711 |
| 6,139,753 A | * | 10/2000 | Taylor | 210/717 |

OTHER PUBLICATIONS

Derwent Abstract Accession No. 1976–09794X, "Spent pickle liquor disposal—treated with acids, pptd. iron salts reacted with metal salts" (corresponding to JP 50009575—Jan. 31, 1975).*

(List continued on next page.)

Primary Examiner—Stanley S. Silverman
Assistant Examiner—Ardith E Hertzog
(74) Attorney, Agent, or Firm—Westman, Champlin & Kelly, P.A.

(57) ABSTRACT

A method for treating and upgrading effluents containing at least a metallic sulphate comprising adding at least a base to the effluent to precipitate the metallic ions in the form of iron oxy-hydroxides $Fe(OH)_x$ wherein $x=2$ and/or 3; separating the precipitated hydroxide calcium sulphate $CaSO_4$; and separating the calcium sulphate $CaSO_4$ precipitated during the preceding step. Said method enables obtainment of calcium sulphate (white gypsum) substantially free of metals and therefore capable of being upgraded and iron oxy-hydroxides likewise capable of being upgraded.

6 Claims, 1 Drawing Sheet

OTHER PUBLICATIONS

Derwent Abstract Accession No. 1977–20817Y, "High purity gypsum mfr.—by adding a calcium waste liq. contg. sulphuric acid and iron" (corresponding to JP 52017391—Feb. 9, 1977).*

Derwent Abstract Accession No. 1977–82557Y, "Sulphuric acid pickling solutions regeneration—using ammonium chloride and then milk of lime and ammonia" (corresponding to SU 536255—Mar. 12, 1977).*

Derwent Abstract Accession No. 1983–763869, "Magnetite and calcium sulphate from etching residue—by treatment with ammonia to ppte. magnetite and then with milk of lime to ppte. calcium sulphite [sic]" (corresponding to SU 973484—Nov. 15, 1982).*

Derwent Abstract Accession No. 1985–039440, "Processing waste sulphuric acid—for recovery of acid and useful gypsum by–product" (corresponding to EP 132820—Feb. 13, 1985).*

Derwent Abstract Accession No. 1986–011018, "Ferric oxide prodn. for ferrite—by adding ammonia source to ferrous salt aq. soln. in inert gas atmos., adjusting pH, oxidising and heating" (corresponding to JP 60235726—Nov. 22, 1985).*

Derwent Abstract Accession No. 1991–097661, "Producing high purity ferrous sulphate soln. from acidic waste soln.—by diluting with water, neutralising with e.g. ammonia to form pptes. which are removed, . . . " (corresponding to JP 03040924—Feb. 21, 1991).*

English translation of SU 536 255, published Nov. 25, 1976.*

English translation of SU 973 484, published Jun. 17, 1977.*

* cited by examiner

METHOD FOR TREATING AND UPGRADING EFFLUENTS CONTAINING METALLIC SULPHATES USING AN AMMONIA ADDITION STEP

CROSS-REFERENCE TO RELATED APPLICATION

This Application is a Section 371 National Stage Application of International Application No. PCT/FR01/01180 filed 17 Apr., 2001, and published as WO 01/81255 on 1 Nov. 2001, not in English.

BACKGROUND OF THE INVENTION

This invention relates to the domain of the treatment of industrial effluents.

More precisely, this invention relates to treatment of liquid effluents containing mainly metallic sulphates and that can also contain sulphuric acid ($H_2SO_4$).

This type of effluents must be treated to give pure effluents that can be disposed of into the natural environment. In the past, the treatment designed to purify this type of effluents containing metallic sulphates consisted of adding calcium hydroxide $Ca(OH)_2$ to them to obtain a precipitate of calcium sulphate $CaSO_4, 2H_2O$, in other words gypsum.

However, this type of process has the major disadvantage that it also causes precipitation of metals originating from metallic sulphates in the form of metallic hydroxides $Me_a(OH)_e$.

There are two problems in using these compounds which are obtained in a mixture with gypsum.

Firstly, the content of polluting metals in the gypsum makes it very difficult to upgrade the gypsum, taking account of the very low imposed metal concentration thresholds at the entry to recycling systems.

There is also the problem of possible coloration by metallic gypsum hydroxides, which are white in the pure state, that compromises upgrades of gypsum for which the whiteness index is a key factor.

In other words, the gypsum obtained at the end of this process cannot be used in industry and must be put into a discharge. Consequently, the pollution will simply be displaced from the liquid effluent to a solid residue.

SUMMARY OF THE INVENTION

The purpose of this invention is to present a process for the treatment of industrial effluents containing metallic sulphates with or without sulphuric acid and that does not have the disadvantages of the process according to the state of the art described above.

In particular, one purpose of this invention is to describe such a process that can produce upgradeable products, in other words products that can usefully be used later in industry.

As a corollary, one purpose of this invention is to present such a process that can significantly reduce quantities of final residues to be stored in the discharge.

Yet another purpose of the invention is to propose such a process that can be used without involving a high additional cost compared with the process according to prior art.

DETAILED DESCRIPTION OF THE PREFERRED EMBODIMENTS

Figure 1:
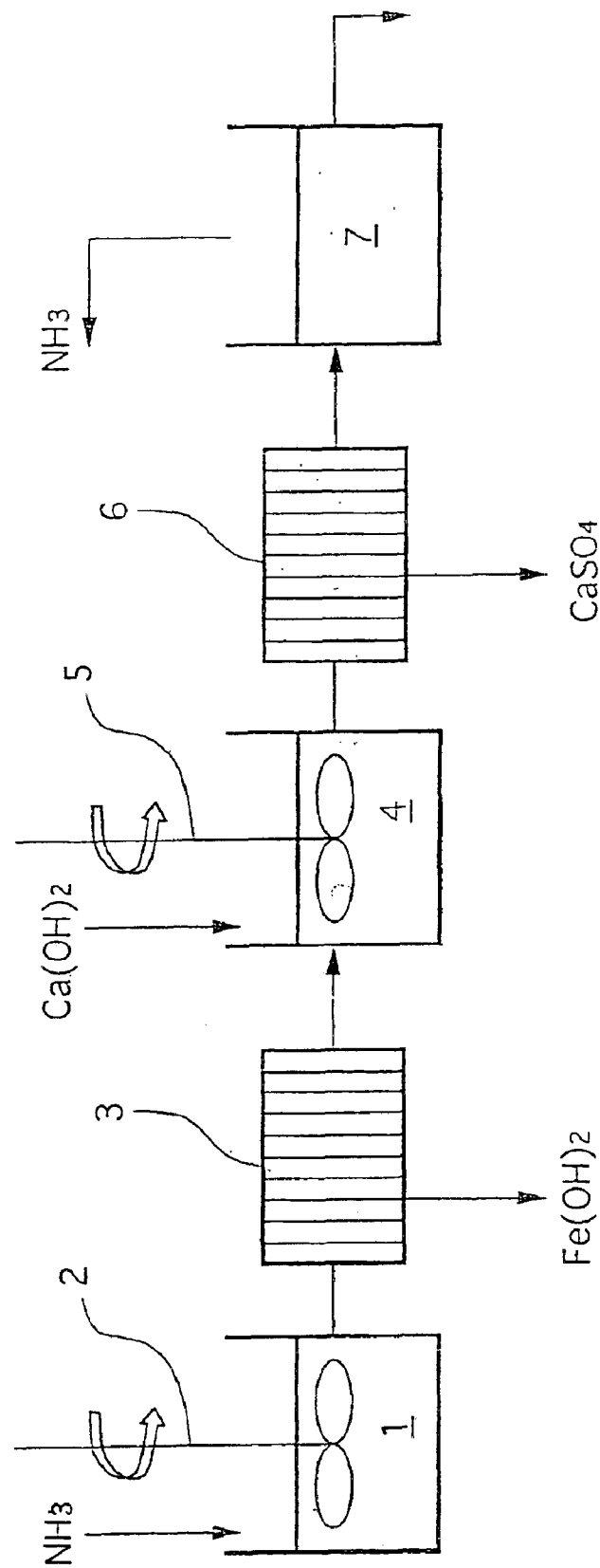
FIG. 1 is a flow diagram of the present invention.

These various processes are achieved according to the invention that relates to an effluent treatment process containing at least one metallic sulphate, the said process being characterised in that it comprises steps that consist of:
- adding a solution of ammonia $NH_3$ to the said effluent to obtain ammonium sulphate $(NH_4)_2SO_4$ in solution and a precipitation of metallic hydroxides $Me_a(OH)_e$; the addition of ammonia enables basification of the effluent to give pH values between 7 and 9.5;
- separate the metallic phase $Me_a(OH)_e$ precipitated during the previous step from the rest of the effluent;
- add calcium hydroxide $Ca(OH)_2$ to the effluent to make the sulphates in solution precipitate in the form of hydrated calcium sulphate $CaSO_4$; the added quantity of $Ca(OH)_2$ satisfying the stoichiometric reaction for the formation of calcium sulphate;
- separate the hydrated calcium sulphate $CaSO_4$ precipitated during the previous step from the rest of the effluent; the residue may be washed and upgraded.

Therefore, the invention recommends that metals contained in the metallic sulphates should be precipitated by using a neutralization step, and then the metallic oxyhydroxides thus precipitated should be separated from the rest of the effluent before precipitating the sulphates in the form of calcium sulphate and separating this calcium sulphate from the rest of the effluent. All these steps are carried out without addition of heat, with reaction temperatures of between 10° and 50° C.

By proceeding according to this method, the recovered calcium sulphate is not polluted by metallic phases. Thus, it has a whitish colour corresponding to its natural colour that makes it upgradeable in the different types of industry, particularly in the cement or plaster industry.

The process according to the invention is also a means of obtaining precipitated metallic oxy-hydroxides that can also be upgraded, in other words usefully used in industry and particularly in steelworks.

The following chemical reaction occurs when ammonia is added to the effluent:

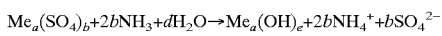

When calcium hydroxide $Ca(OH)_2$ is added, the $CaSO_4$ compound is partially precipitated according to the following reaction:

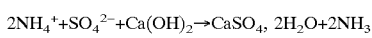

According to one particularly attractive preferred variant of the invention, the ammonia $NH_3$ formed in this reaction is stripped or distilled so that the effluent can be separated and purified from this compound.

According to a preferred variant of the invention, the ammonia $NH_3$ recovered after this stripping or this distillation is then rerouted to the beginning of the process so that it can be used in the step mentioned above for precipitation of metals in the form of metallic oxy-hydroxides $Me_a(OH)_e$.

In order to improve the efficiency of the process, the process preferably includes a preliminary step designed to increase the pH of the effluent so that it has a pH of about 2. Raw effluents containing metallic sulphates may also contain an acid such that they have a very acid pH less than 2 that can damage the reactional equilibrium. This type of preliminary neutralization step may be carried out in different ways known to an expert in the subject.

Advantageously, it will be noted that the steps to add alkaline nitrogenous compounds and calcium carbonate or hydroxide are advantageously carried out while stirring.

Furthermore, for better application of the process, a metal concentration in the effluent at the beginning of the process should be between 3 g/l and 120 g/l.

In conclusion, compared with prior art, the process according to the invention can be used to obtain two upgradeable by-products, namely firstly white gypsum $CaSO_4, 2H_2O$, and secondly $Me_d(OH)_e$, instead of a non-upgradeable mix of these two compounds.

The invention and its various advantages will be more easily understood after reading the following description of the embodiment with reference to the single figure.

According to this embodiment, an industrial effluent with the following composition of metals and a pH close to 2.5 and a temperature of 20° C. is added into a tank 1:

| Al:    | 360 mg/l   | Fe: | 7600 mg/l | Na: | 300 mg/l |
|--------|------------|-----|-----------|-----|----------|
| Zn:    | 15 mg/l    | Mn: | 590 mg/l  | K:  | 70 mg/l  |
| Ca:    | 500 mg/l   | V:  | 79 mg/l   | Mg: | 450 mg/l |
| $SO_4$: | 20200 mg/l | Cr: | 23 mg/l   | Cd: | 0.7 mg/l |
| Cu:    | 1.6 mg/l   | Ni: | 0.8 mg/l  | Pb: | 0.9 mg/l |

25 ml of ammonia ($NH_3$) at 16.6 mol/l is added per liter of effluent, which corresponds to an $NH_3$/Fe molar ratio of about 3 and a pH of the effluent of about 9.5.

The following chemical reactions occur:

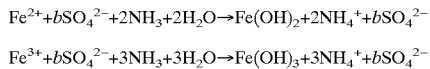

giving the following general reaction:

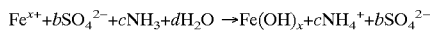

This reaction leads to the precipitation of mainly iron oxy-hydroxide $Fe(OH)_x$.

After –½ to 2 h of stirring using stirring means 2, the mix is filtered using filtration means 3. The analysis of the filtrate (filtrate 1) and the dry residue gives the following results:

Composition of Filtrate 1:

| Al:    | 0.5 mg/l   | Fe: | <0.1 mg/l | Na: | 248 mg/l  |
|--------|------------|-----|-----------|-----|-----------|
| Zn:    | 1.2 mg/l   | Mn: | 1.0 mg/l  | K:  | 65 mg/l   |
| Ca:    | 450 mg/l   | V:  | 0.3 mg/l  | Mg: | 300 mg/l  |
| $SO_4$: | 20100 mg/l | Cr: | 0.06 mg/l | Cd: | <0.05 mg/l |
| Cu:    | 0.5 mg/l   | Ni: | 0.6 mg/l  | Pb: | <0.05 mg/l |

Elementary Composition of the Metallic Residue:

| Al: | 11.4 g/kg of D.M. | Fe: | 461 g/kg of D.M. | S:  | 22.0 g/kg of D.M. |
|-----|-------------------|-----|------------------|-----|-------------------|
| Zn: | 0.63 g/kg of D.M. | Mn: | 24.0 g/kg of D.M. | K:  | 0.20 g/kg of D.M. |
| Ca: | 3.0 g/kg of D.M.  | V:  | 4.2 g/kg of D.M. | Mg: | 2.2 g/kg of D.M.  |
| Cu: | 0.2 g/kg of D.M.  | Cr: | 1.3 g/kg of D.M. |     |                   |

Filtrate 1 is then transferred into a tank 4 in which 88 ml of milk of lime at 200 g/l is added, per liter of filtrate 1. The mix is then stirred for –½ h using stirring means 5 and is then filtered using filtration means 6 to recover a filtrate (filtrate 2) and a precipitate of white gypsum (calcium sulphate).

The following reaction occurs:

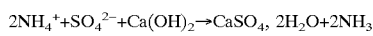

The analysis of filtrate 2 and white gypsum gives the following results:

Composition of Filtrate 2:

| Al:    | 0.4 mg/l   | Fe: | <0.1 mg/l | Na: | 180 mg/l   |
|--------|------------|-----|-----------|-----|------------|
| Zn:    | 0.5 mg/l   | Mn: | <0.1 mg/l | K:  | 41 mg/l    |
| Ca:    | 880 mg/l   | V:  | <0.1 mg/l | Mg: | 0.1 mg/l   |
| $SO_4$: | 1200 mg/l  | Cr: | 0.05 mg/l | Cd: | <0.05 mg/l |
| Cu:    | 0.15 mg/l  | Ni: | 0.2 mg/l  | Pb: | <0.05 mg/l |

Composition of Gypsum:

| Fe: | 0.42 g/kg of D.M. | S:  | 174 g/kg of D.M. |
|-----|-------------------|-----|------------------|
| Zn: | 0.29 g/kg of D.M. | Al: | 2.1 g/kg of D.M. |
| Ca: | 232 g/kg of D.M.  | Mg: | 18 g/kg of D.M.  |

The gypsum obtained is almost pure and has very little metallic residues. Therefore, it may easily be upgraded.

The filtrate 2 is then stripped or distilled in a reactor 7 to recover the ammonia that is returned to the beginning of the installation.

The embodiment of the invention described herein is not intended to limit the scope of the invention. Therefore, many modifications can be made to it without going outside the scope of the invention.

We claim:

1. A process for the treatment of effluents containing at least one metallic sulphate, the process comprising the steps of:

1.) adding a solution of ammonia $NH_3$ to the effluent to obtain ammonium sulphate $(NH_4)_2SO_4$ in solution and a precipitation of iron oxy-hydroxides $Fe(OH)_x$ wherein x=2 and/or 3; the addition of ammonia enables basification of the effluent to give pH values between 7 and 9.5;

2.) separating the metallic phase $Fe(OH)_x$ wherein x=2 and/or 3 precipitated during the previous step from the rest of the effluent;

3.) after separating $Fe(OH)_x$ wherein x=2 and/or 3, adding calcium hydroxide $Ca(OH)_2$ to the effluent to make the sulphate in solution precipitate in the form of hydrated calcium sulphate $CaSO_4$; the added quantity of $Ca(OH)_2$ satisfying the stoichiometric reaction for the formation of calcium sulphate;

4.) separating the hydrated calcium sulphate $CaSO_4$ precipitated during the previous step from the rest of the effluent; the residue may be washed and upgraded.

2. The process according to claim 1, comprising stripping or distilling of ammonia $NH_3$ formed during step 3.

3. The process according to claim 2, comprising rerouting the ammonia derived from the stripping or distillation step to step 1.

4. The process according to claim 1, comprising a preliminary effluent neutralization step so that its effluent's pH is more than 2.

5. The process according to claim 1, comprising that steps 1 and 3 are made while stirring, all these steps being done without any heat addition, with reaction temperatures preferably between 10° and 50° C.

6. The process according to claim 1, wherein a metal concentration of the effluent is between 3 and 120 g/l at the beginning of the process.

* * * * *